United States Patent Office 3,666,530
Patented May 30, 1972

3,666,530
NOVEL SILICIOUS SILICONE BONDED MATERIALS
Walter A. Aue and Corazon R. Hastings, Columbia, Mo., assignors to Research Corporation, New York, N.Y.
No Drawing. Continuation-in-part of application Ser. No. 873,090, Oct. 31, 1969. This application Oct. 22, 1970, Ser. No. 83,215
Int. Cl. B32b 17/00; C03c 17/30
U.S. Cl. 117—54                                   20 Claims

ABSTRACT OF THE DISCLOSURE

There is provided a novel type of silicious material having bonded thereto silicone or polysiloxane polymers. These novel materials are produced by activating all or most of the available hydroxyl groups in a silicious surface and reacting said hydroxyl groups with silanes or siloxanes having labile groups. These silyl or siloxyl moieties are then polymerized to yield a material having a silicone polymer chemically bonded to the surface of the silicious material. These novel products are useful as a combined stationary and liquid phase in gas chromatography. They are especially useful in the chromatography of highly polar materials.

RELATED APPLICATIONS

This application is a continuation-in-part of our copending application Ser. No. 873,090, filed Oct. 31, 1969, and now abandoned.

The invention described herein was made in the course of work under a grant or award from the Department of Health, Education, and Welfare.

FIELD OF OF THE INVENTION

Silicone surfaces for silicious materials.

DESCRIPTION OF THE PRIOR ART

The use of silica supports of various types is well known in the field of gas chromatography. Such supports vary from crushed firebrick through silica gel. These materials may be used either per se as the support -cum-adsorptive layer in the gas chromatographic column or else they may be utilized as a support and have other materials adsorbed on them to constitute the liquid phase in gas liquid chromatography. Among the liquid phases which have been used in gas liquid chromatography have been various types of silicone polymers. The classical principle of adsorbing a silicone polymer on a silica carrier is known to suffer from two problems. It is well known that a silica surface may consist of epoxy siloxane groups, silanol groups or, a mixture of the two. This gives rise to an uncertainty as to the actual nature of the surface and therefore interferes with the reproducability of results obtained from columns using these materials as supports.

This problem also has been solved by treating such surfaces with labile silanes such as dimethyldichlorosilane, methyltrichlorosilane, hexamethyldisilazane and similar compounds which convert the free hydroxyl groups into silyl ethers. This so-called deactivation of the active sites on the support surface will tend to diminish such malfunctions of the chromatographic process such as tailing of peaks, irreversible absorption, variations of retention time with sample size and composition, low column efficiency, non-linear responses and the like.

The use of silicones as the liquid phase in gas liquid chromatography, suitably on silica supports, preferably deactivated silica support has been found most useful in the chromatography of polar material. However, one basic problem in gas liquid chromatography particularly where relatively large samples are run at relatively high temperatures has been the problem of column bleed. That is to say that the liquid phase is eluted from the support by a combination of the sample throughput and the carrier gas. This effect leads to nonreproducibility of results on a particular column. More recent work in the gas chromatographic field involves the coupling of a gas chromatographic apparatus with a mass spectrometer. Thus the elution of the liquid phase from the chromatographic column will give rise to erroneous results in the mass spectrometric read out. Thus, if it were possible to stabilize the liquid phase, that is to say, the silicone phase on the solid substrate, advantages of accuracy would accrue.

Abel et al. [J. Chromatog 22, 23 (1966)] reported that they had polymerized hexadecyltrichlorosilane on a Celite® (a diatomaceous earth) surface and have found that this material had good thermal stability but did not perform well in the chromatography of highly polar materials. It is postulated by Abel that active sites, i.e. silanol groups, are formed by water on the Celite surface during the polymerization of the hexadecyltrichlorosilane and that the polymer thus formed becomes bonded to the Celite surface via these silanol groups.

If Abel's presumption is correct, then the polymer produced by the polymerization of hexadecyltrichlorosilane should be bonded to the surface of the Celite, and such bonding could be demonstrated by prolonged extraction of the material with solvents of different characteristics which would, after the extraction process, show no silicone content.

We have prepared coated materials (i.e. coated Celites) by the process of Abel. These materials were extracted for at least thirty-six (36) hours in a Soxhlet apparatus. The separate extractions were carried out with hexane, benzene, ether, chloroform, methylene chloride, ethanol and methanol. Under these conditions the silicone phase was completely removed from the product produced by Abel's method. We were therefore led to conclude that the Abel product was not chemically bonded to the surface of the silicious material.

SUMMARY OF THE INVENTION

There have been developed novel products wherein there is bonded a silicone polymer to a silicious surface.

These novel products are silicious materials having a surface containing groups having the partial structure as follows:

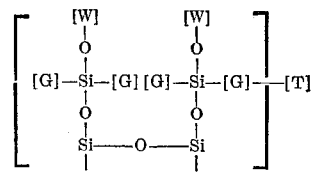

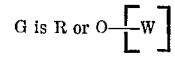

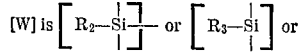

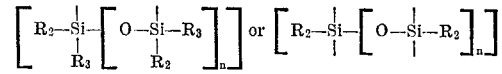

and may be the same or different wherein at least one bond of one silicon atom is linked to an oxygen atom outside the group, the remaining bonds linked to other O—[W] groups in the molecule to form a polymeric chain and the terminal W group in a chain is bonded to group T: T is OH, a labile group,

or loweralkoxy of 1 to 5 carbon atoms; R is lower-alkyl, loweralkylphenyl, phenyl or phenyl lower alkyl wherein the alkyl group contains 1 to 5 carbon atoms; $R_2$ and $R_3$ are alkyl containing 1 to 30 carbon atoms, phenyl, substituted phenyl wherein the substituents are selected from the group consisting of loweralkyl, loweralkoxy, halo and nitro, or phenylloweralkyl wherein the lower alkyl groups contain from 1 to 5 carbon atoms; $R_4$, $R_5$ and $R_6$ are phenyl, loweralkyl, loweralkoxy, loweralkylphenyl or phenylloweralkyl and may be the same or different; wherein a labile group is any group which will react with (a) halosilane, (b) water or (c) a loweralkanol, and $n$ is an integer.

These novel products are produced in three, and optionally two or four, distinct steps.

The first step comprises activating all of the available silanol groups in the surface of the silicious material by opening the epoxysiloxane groups with water, aqueous mineral acid or aqueous alkali. The suitability of these agents is determined to a certain extent by the nature of the silicious surface and the relative suitabilities of these agents will be discussed in further detail hereinbelow. The thus produced silanol groups are usually, but not always subjected to an initial reaction with a silane possessing at least two labile groups. One of these labile groups will react with the hydroxy groups of the silanol and the remaining groups will be utilized in the next step.

The activated or initially reacted partially silated material produced above is then contacted with a silicone monomer or oligomer having at least two possibly three, labile groups in the polymerization reaction. Where a network of polymer is desired, three labile groups are preferred; especially, where the monomer possesses, for example, a long alkyl "tail" which will in effect serve as the bonded liquid phase, a monomer having two labile groups is preferred when R is a small alkyl substituent as in dimethylpolysiloxane. One of the labile groups of the monomer will react with a labile group which has been attached to the silicious surface by the process of the previous step, and the second labile group will react with another labile group attached to either another monomer molecule, or a second, surface attached labile group. Since the process requires a substantial excess of monomer over available reaction sites, it will be seen that a large variety of possible combinations of polymer are available. It will further be seen that where the monomer possesses three rather than two labile groups it will be possible to produce a more tightly woven and cross-linked silicone network than would be possible with a monomer having two labile groups.

It is to be understood that several monomer units may react with each other and then attach at one or more points to the surface of the substrate. The exact structure of the products produced is not critical to the present invention.

In reference to the foregoing polymerization step the terms monomer and oligomer suitably a siloxane oligomer with at least two labile groups may be used interchangeably.

In order to avoid "the active side problem" discussed hereinabove, the reactive sites produced in the polymerization process may, if desired, now be deactivated. This deactivation reaction is carried out in the conventional manner by treating the substance thus produced with a silane having one labile group such as bis(trimethylsilyl)-acetamide, hexamethyldisilazane, or trimethylchlorosilane, the former being preferred, or else a silane having two labile groups such as dimethyldichlorosilane followed by deactivation of the remaining labile group by a quenching agent such as methanol or the like.

It has further been found that the degree of monomer "load" is of importance in the success of the process of producing the novel composition of the present invention. If the monomer load of certain monomers is too low then although polymerization will occur, the degree of bonding to the silicious surface has been found to be low and the polymer produced will be substantially eluted under the test conditions discussed above, however, useful materials have been obtained with a load as low as 0.1%.

On the other hand, it has been found that where the monomer load is too high say, more than 50% then the particles of the substrate stick together during the polymerization process thus yielding a product which does not have the desired particulate qualities for use in gas liquid chromatography. It is within the scope of the present invention that one or more monomers or oligomers may be used in the polymerization step thus giving rise to the availability of a considerable variety of surface characteristics.

Some of the possible reactions constituting the activation, initial reaction, polymerization and deactivation steps of the process of producing the novel products of the present invention are illustrated hereinbelow. These flow diagrams should be considered merely as illustrative and in no way limiting since variations thereon within the scope of the general principles illustrated thereby would be apparent to one skilled in the art.

(1) Surface treatment:

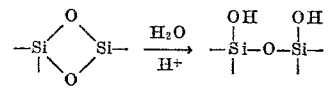

(2) Initial reaction:

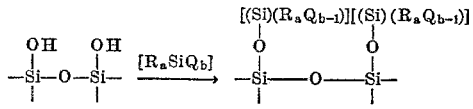

where R is an alkyl, aryl, alkaryl, or aralkyl group, Q is a monovalent labile group. $a+b$ are integers totaling 4 per Si atom and $b$ is 2 or 3. Where Q is polyvalent the values of $a$ and $b$ must be adjusted accordingly.

(3) Polymerization reaction:

Mode (i) where $a=2$ and $b=2$ $R[(_2X)SiZ_3]$

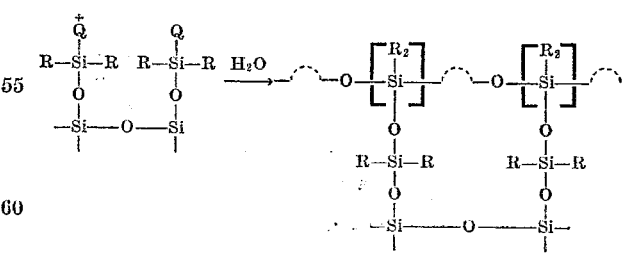

where Q is a labile group and $x$ is an integer and the dotted bond

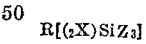

indicates a polymeric chain where the bonding may be directly between the moieties shown or via several of such units in either straight, branch chain or cross-linked embodiment and $R_2$ is a non-labile substituent group. Z is a labile group. Q and Z are labile groups of the class which will (A) react with each other, (B) react with water, (C) react with loweralkanols and R is as in the initial reaction above.

Mode (ii) where $a$ is 1 and $b$ is 3

$X[(R_2)SiZ_3]$
+

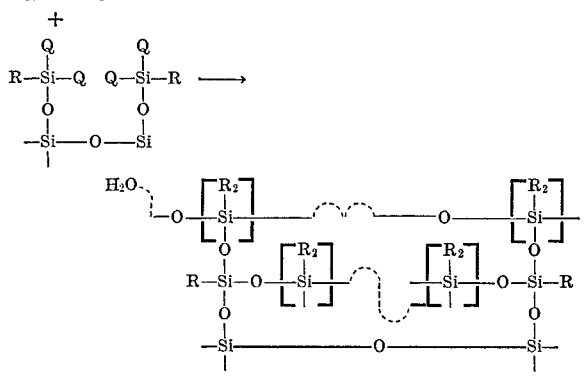

where Q, R, $R_2$, Z and $x$ are as in mode (i) above.

Mode (iii) in accordance with modes (i) and (ii) above but in place of $(R_2)SiZ_3$ as the monomer there may be used $(R_2)_2SiZ_2$, or $(R_2)(R_3)SiZ_2$ where $R_3$ is also a nonlabile substituent group. The units of the polymer will then have only two bonds available for polymer formation (only one on the terminal unit attached to the surface of the substrate) instead of the three bonds available in modes (i) and (ii).

Mode (iv) in accordance with modes (i), (ii) or (iii) above the "monomer" is an oligomer of general formula $$Z(R_2)_2Si-[(R_2)_2SiO]_n-O-Si(R_2)_2Z$$

$$Z(R_2,R_3)Si-[(R_2,R_3)SiO]_n-O-Si(R_2,R_3)Z$$

or $$Z_2(R_2)-Si-[(R_2)ZSiO]_n-O-Si(R_2)Z_2$$

as well as conglomerates thereof. These oligomers are produced by partial hydrolysis of monomers of the structures $(R_2)_2SiZ_2$ and $(R_2)SiZ_3$. The term conglomerates means, in the context of this invention oligomers of specifically unknown structure derived from the partial hydrolysis of mixtures of components of these two classes of halosilanes, $n$ is an integer from 1–10 or 0.

(4) Deactivation

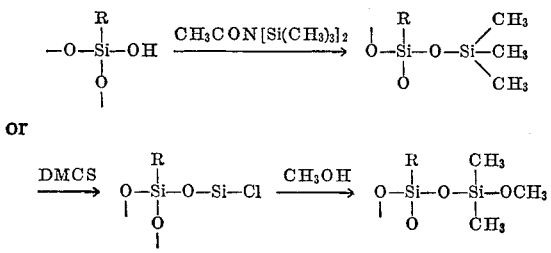

when DMCS is dimethyldichlorosilane.

In the preferred modifications of the foregoing procedures as illustrated in steps 1, 2 and 3 (i)–(iv), R is lower alkyl of 1 to 5 carbon atoms, phenyl, lower alkyl phenyl of 1 to 5 carbon atoms in the side chain or phenyl lower alkyl of 1 to 5 carbon atoms in the side chain. $R_2$ and $R_3$ are selected from the group consisting of alkyl containing 1 to 30 carbon atoms, phenyl, substituted phenyl wherein the substituents are selected from the group the lower halo, nitro; and phenyl lower alkyl wherein the lower alkyl moiety contains from 1 to 5 carbon atoms, and may be the same or different. $[(R_2)SiZ_3][(R_2)_2SiZ_2]$ and $[(R_2)(R_3)SiZ_2]$ represent, preferably, polyhalosilanes, polyalkoxysilanes, polyacyloxysilanes, alkylpolyacyloxysilanes or alkylpolyalkoxysilanes. In step 3 mode (iv) the oligomers represent, preferably polyhalopolyalkylsiloxanes derived from polyhaloloweralkylsilanes.

In comparison of the column efficiency of columns utilizing the materials produced by the present invention with columns packed with conventional silica materials having adsorbed thereon high polymer silicones, with materials which do not possess chromatographic difficulties (i.e. hydrocarbons), both columns showed approximately the same degree of efficiency as measured by Van Deemter plot. In measurements carried out to determine column bleed substantially less than columns produced by the prior art methods. Furthermore, it was found that columns utilizing the novel materials showed further improvements upon subjecting them to an initial stabilizing heat treatment.

It has further been found that certain polar compounds, such as haloacetylated esters of amino acids, triazines, certain pesticides, and trimethylsilyl derivatives of nucleic bases, which are acknowledged to be extremely difficult to chromatograph and resolve by the use of prior art gas chromatographic materials are readily resolved by columns packed with the novel materials of the present invention.

DESCRIPTION OF THE PREFERRED EMBODIMENTS

The substrates utilized in the process of the present invention include within their scope all silicious surfaces regardless of internal structure. While the principal purpose of the novel compositions of the present invention is as substrates in gas liquid chromatography, the invention is not limited thereto. The gas liquid chromatography substrates include various forms of diatomaceous earth such as Chromosorbs®, Celite®, silica gels, silica beads, glass beads, etc. It is within the scope of the present invention that the principles thereof may be applied to the bonding of silicone polymers to other surfaces such as glass, glass lined steel, any other substance having a silicious surface. Several modes of activation are available:

(1) The number of free hydroxyl groups available on the surface is estimated by methods known in the art, and the substance treated with an excess of water over that needed to form these hydroxy groups, suitably a 100 to 500 percent excess preferably a 100 percent excess and the mixture warmed to from about 50° C. to about 80° C. suitably from about 55° C. to 75° C. for a period of from about 8 to 18 hours.

(2) The treatment as for method 1 but in place of water there is utilized concentrated aqueous mineral acid. While nitric and sulfuric acids may be employed, it has been found preferable to utilize concentrated hydrochloric acid (ca. 33 percent HCl w./w.).

(3) The material is heated under reflux with an excess of concentrated hydrochloric acid, washed and dried. In the preferred modification of this mode, the material is heated under reflux with a large excess of concentrated aqueous hydrochloric acid for from about 2 to about 24 hours preferably for about 4 hours, filtered and washed with distilled water until the wash appears to be neutral. The material is then washed with an organic water miscible solvent. Acetone has been found especially suitable since it has no tendency to react with any of the newly formed active centers. The material is then placed under vacuum for a short time at ambient temperature to ensure evaporation of the organic solvent.

(4) The material is suspended in aqueous alkali, sodium hydroxide or potassium hydroxide being suitable in strength of between 2 N and 8 N. The suspension is then heated under reflux for from about 15 to about 60 minutes washed with distilled water, and the residual alkali removed by suspension of the material in dilute mineral acid suitably in dilute aqueous hydrochloric acid (say ca. 1 N). The material is then washed with water until the wash is neutral, and then dried in the manner similar to that set forth in procedure 3 supra. Where the materials are especially sensitive to alkaline attack, such as Porasil® beads, the amount of alkali utilized is calculated to dissolve not more than 5 percent of the material.

(5) Where it is desired to substantially increase the number of available silanol groups, the substrate is prepared in accordance with procedure 3 supra and then suspended in a reaction inert organic solvent of moderately high boiling point in the presence of a silane having several labile groups attached thereto. The residual labile groups are then converted into silanol groups and the material dried in the manner set forth in procedure 3. Any silane having at least two labile groups may be utilized, thus there may be mentioned alkyl polyhalosilanes, polyalkylpolyhalosilanes, silicic acid polyesters, and the like. Especially preferred, however, is the most readily available member of this group, namely, methyltrichlorosilane.

As a solvent a dry hydrocarbon solvent is preferred suitably an aromatic hydrocarbon such as toluene, xylene, or the like. It is preferred to utilize from about 2 to about 10 percent by weight of methyltrichlorosilane in dry toluene, suitably about 5 percent (w./w. of the silane). The product of treatment 3 is then suspended in this solution and heated under reflux for from about 30 to about 120 minutes, filtered, washed with solvent not containing the silane, air dried, to remove substantially all the organic solvent followed by water wash to substantial neutrality. The residual labile groups are then converted into hydroxy groups by treatment with aqueous alkali. It is preferred to use aqueous sodium or potassium hydroxide having a pH up to pH 10. The alkaline solution is removed, the substrate washed with water to neutrality, and made very slightly acid by washing with dilute aqueous hydrochloric acid. After acid wash, the pH of the substrate should lie between about pH 4 and pH 6. The material is then dried by the same method as used in procedure 3.

(5a) In place of utilizing the preferred methyltrichlorosilane of procedure 5, there is utilized a dimethyldichlorosilane. The thus produced substrate is suspended in the reaction inert organic solvent suitably an aromatic solvent for example, toluene or xylene, to which is added an appropriate amount of the silicone monomer. The mixture is then subjected to polymerization in accordance with the procedure set forth hereinbelow.

(6) In order to provide reference conditions, that is to say, to minimize the number of available silanol groups in contrast to the maximization achieved by procedures 1 through 5, the material, suitably the diatomaceous earth, is heated at between 500° C. and 600° C. for from about 8 to 18 hours.

While all of the procedures 1 through (5a) set forth above have been found to be operative, optimum results have been obtained utilizing treatment 3. With respect to diatomaceous earths such as Chromosorb under certain circumstances the results may be somewhat further improved by utilizing treatment 5. However, in view of the additional effort required by treatment 5 the results obtained by treatment 3 are to be considered as satisfactory.

After activation, the activated substrates are subjected to the initial reaction giving rise to available labile groups. In this step, the substrates are suspended in a reaction inert organic solvent, suitably a hydrocarbon solvent such as a moderately high boiling aromatic solvent suitably toluene, xylene and the like, in the presence of a large excess of silane having at least two labile groups. While any silanes in this category may be utilized, methyltrichlorosilane or dimethyldichlorosilane are preferred. The suspension is then heated under reflux for from about 2 to about 6 hours suitably for about 4 hours, and the mixture evaporated substantially to dryness in vacuo.

It is most important in this stage of the procedure to exclude all or substantially all moisture since water will react with the labile groups thus making them unavailable as bonding sites for the polymer to be produced in the following stage of the procedure.

There may be used as the silicone monomer (or oligomer) any silane or siloxane having at least two labile groups attached thereto. For reasons of cost, availability and greater activity, polyhalosilanes are preferred. The remaining, non-reactive, portion of the monomer (or oligomer) may be varied in accordance with the desired properties of the polymer to be produced. Thus there may be utilized alkyl halosilanes, arylhalosilanes, alkarylhalosilanes, aralkylhalosilanes and alkylhalosiloxanes as well as silanes within the aforementioned categories having substituents attached to the non-reactive portion of the molecule where such substitution will serve a particularly desired end with respect to the properties of the polymer to be produced. It has been found that octadecyltrichlorosilane, phenylmethyldichlorosilane, diphenyltrichlorosilane and chlorophenyltrichlorosilane are all operative within the purview of the present invention. The oligomers utilized in this stage of the reaction are those derived from readily available lower alkylhalosilanes. These include methyl, ethyl, propyl or butyl halosilanes, suitably the chlorosilanes, dimethyl, diethyl, dipropyl, and methyl hydrogen halosilanes, suitably the chlorosilanes or mixtures thereof. These monomers and oligomers have been utilized to demonstrate the operability of the present invention, but the scope of the invention should in no way be considered as being limited thereby.

Where the oligomer is used in place of a simple monomer the appropriate halosilane is taken up in a suitable, reaction inert, volatile solvent and a solution of water in the same solvent is added. It is desirable to use a solvent in which water is moderately soluble, hence a polar nonhydroxylic solvent such as acetonitrile or the like is indicated. The amount of water used must be strictly controlled to achieve the desired degree of hydrolysis of the halosilane. From 2–10, suitable 2–6 moles of water per 4 moles of halosilane are used. Thus for trihalosilanes 3 moles of water are used for 4 moles of halosilane. In order to maintain strict control over the water/halosilane ratio, it is important to insure the anhydrous nature of the solvent. This may be achieved by storing the solvent over a suitable drying agent such as anhydrous calcium sulfate.

The polymerization reaction involves two stages, the initial reaction which produces labile centers attached to the surface and the polymerization reaction itself between the monomer units themselves and between monomer or oligomer units and the labile centers attached to the surface. In the first stage of this procedure a calculated amount of monomer or oligomer suitably in a reaction-inert organic solvent suitably a hydrocarbon solvent or acetonitrile is added to the substrate which has been previously activated by the method set forth above, and the suspension thoroughly mixed. It has been found that in order to obtain good polymerization the load factor should be held between 3 and 25 percent and the best results have been obtained where the load factor lies between about 10 and 20 percent. The load factor (in percent) is 100 times the ratio of silicone monomer over total weight of silicone monomer plus solid substrate.

The suspension of treated substrate in monomer solution is evaporated. Where a carrier solvent is used, the carrier solvent is first removed at moderate water bath temperatures under a low vacuum with agitation, after removal of the solvent the temperature of the vessel is held at between 60 and 80° C. suitably at around 65° C. and all remaining volatile components removed under oil pump vacuum that is to say pressure of the order of 1 mm. of Hg. Where the monomers utilized are very volatile, water pump pressures, that is to say pressures of down to .10 mm. of Hg and short evaporation times should be utilized in the drying step.

The monomer attached to the substrate is then polymerized using fluidized bed procedures in a gas stream suitably in air stream containing a certain amount of water vapor.

It must be understood that in view of the flexibility of results obtainable in the process of the present invention, a very considerable variety of reaction conditions may be employed. The temperature of polymerization is set by preheating the air stream to a temperature lying between ambient temperature and 150° C., suitably 100–110° C. While a certain amount of water vapor is important in order to complete the polymerization reaction, too large amounts of water will cause an inferior product. It has been found advantageous to optimize the temperature and the water content of the fluidized bed carrier gas for each type of polymer while not limiting the scope of the invention thereto it has been found useful to introduce 5–15, suitably 6–8 ml. of water per hour into an air stream of 50–1000 about 200 liters per hour.

If desired, for purposes of obtaining an entirely nonreactive substrate and liquid phase, the materials obtained after the polymerization step may be deactivated by further silylation. This may be achieved by suspending the coated substrate in a high boiling reaction inert hydrocarbon solvent such as toluene or xylene, in the presence of a small amount i.e. from about 2 to 5 percent by weight of a silylating agent such as bis(trimethylsilyl) acetamide or dimethyldichlorosilane. Preferably the reaction is carried out at moderately elevated temperatures suitably at from about 120 to about 160° C. for from about 1 to about 5 hours. The product is then filtered, washed with a lighter hydrocarbon solvent such as benzene, suspended in an alkanol suitably methanol in order to deactivate any remaining labile groups on either the substrate or the silylating agent followed by extraction, suitably Soxhlet extraction with an anhydrous alkanol suitably methanol to remove any residual, non-bonded materials.

The efficiency of the bonding of the polymers produced in the foregoing step may be determined by extracting the material with different solvents such as polar solvents and non-polar solvents. Examples of such solvents are hexane, benzene, ether, chloroform, methylene chloride, ethanol and methanol. In the standard test procedures, the materials were extracted wither for 36 hours in a Soxhlet extractor or 15 hours in a Goldfish extractor. Results obtained by these test extractions are summarized hereinbelow.

Example I.—Acid activation of substrate 86.6 g. of Chromosorb G 60/80 acid washed (a diatomaceous earth produced by Johns-Manville Co.) is suspended in 500 ml. of concentrated aqueous hydrochloric acid and heated under reflux for 4 hours. The acid layer is removed by decantation and the Chromosorb filtered in a coarse sintered glass filter. The Chromosorb is then washed with distilled water until the wash is neutral, and then suspended in 200 ml. of acetone, and the acetone removed by filtration. The acetone wash step is repeated two additional times and the Chromosorb placed into a vacuum desiccator. The desiccator is evacuated and held at ambient temperature for 19 minutes.

In place of Chromosorb G there may be utilized Chromosorb W 60/80 "acid washed" or Chromosorb G 60/80, "nonacid washed."

Similarly but in place of using Chromosorbs, there may be utilized Corning Glass Beads No. 0202, 120/140; Silica gel, Davidson 08, 60/80 and Porasil type D, 100/150.

Example II.—Alkali activation of substrate 83.7 grams of Chromosorb G 60/80 "acid washed" are suspended in 500 ml. of 6 N aqueous sodium hydroxide, heated under reflux for 30 minutes and the alkaline solution removed by decantation and filtration. The Chromosorb is washed three times with distilled water, filtered and suspended in 200 ml. of 1 N aqueous hydrochloric acid. The acid is removed by decantation and filtration and the Chromosorb washed with distilled water until neutral. The Chromosorb is then washed three times with 200 ml. of acetone, filtered and dried in a vacuum desiccator at ambient temperature for 10 minutes. In accordance with the foregoing procedure, dimethyldichlorosilane may be utilized in place of bis (trimethylsilyl) acetamide.

Example III.—Maximization of available silanol groups 93.3 grams of Chromosorb G 60/80 acid washed, are subjected to the initial activation treatment of Example "I." The activated material is then suspended in 200 ml.

| Support | Liquid phase monomer | Percent load | | Treatment | Extraction (percent of theoretical) |
|---|---|---|---|---|---|
| Chromosorb G, 60/80, "acid washed" | $C_{18}H_{37}SiCl_3$ | 13.2 | None | | 76 |
| | | 13.2 | 1 | $H_2O$ | 11 |
| | | 13.2 | 2 | HCl | 16 |
| | | 13.2 | 6, 2 | Heat, HCl | 11 |
| | | 13.2 | 6 | Heat | 68 |
| | | 13.2 | 3 | Conc. HCl reflux | 1 |
| | | 13.2 | 4 | 2 N NaOH | 46 |
| Chromosorb G, 60/80, "acid washed" | $C_6H_5(CH_3)SiCl_2$ | 14.9 | None | | 24 |
| | | 14.9 | 1 | $H_2O$ | 35 |
| | | 14.9 | 2 | HCl | 80 |
| | | 14.9 | 6, 2 | Heat, HCl | 71 |
| | | 14.9 | 6 | Heat | 76 |
| | | 14.9 | 3 | Conc. HCl, reflux | 2 |
| | | 16.3 | 4 | 6 N NaOH | 6 |
| Chromosorb G, 60/80, "acid washed" | $(C_6H_5)_2SiCl_2$ | 5.7 | 3 | Conc. HCl, reflux | 30 |
| | | 6.7 | 3, 5 | Conc. HCl, reflux, KOH, no initial reaction | 9 |
| | | 6.7 | 3, 5a | Conc. HCl, reflux, KOH, no initial reaction | 7 |
| | | 6.7 | 3, 5a | As above plus reflux for 2 hours with monomer | 12 |
| Chromosorb G, 60/80, "acid washed" | $C_{18}H_{37}SiCl_3 +$ $C_6H_5(CH_3)SiCl_2$ | 6.5 | 1 | $H_2O$ | 21 |
| | | 8.3 | 3 | Conc. HCl, reflux | 2 |
| Chromosorb G, 60/80, "acid washed" | $C_{18}H_{37}SiCl_3 +$ $C_6H_5SiCl_3$ | 3.3 | 1 | $H_2O$ | 8 |
| | | 4.3 | 3 | Conc. HCl, reflux | 1 |
| Porasil type C, 100/150 | $C_6H_5(CH_3)SiCl_2$ | 1.3 | 3 | Conc. HCl, reflux | 100 |
| Porasil type D | $C_6H_5(CH_3)SiCl_2$ | 1.5 | 4 | NaOH Calc. amount, reflux for 1 hour | 67 |
| Porasil type D | $C_{18}H_{37}SiCl_3$ | 2.4 | 3 | Conc. HCl, reflux | 8 |
| Microbeads No. 456 | $C_6H_5(CH_3)SiCl_2$ | 0.13 | 3 | Conc. HCl, reflux for 18 hours | 100 |
| | $C_6H_5(CH_3)SiCl_2$ | 0.26 | 4 | 6N NaOH, reflux for 15 minutes | 71 |
| | $C_6H_5(CH_3)SiCl_2$ | 0.29 | 4 | 6N NaOH reflux for 6 hours | 20 |
| | $C_6H_5(CH_3)SiCl_2$ | 0.26 | | 18% $HNO_3$, 50°, 35 hours | 100 |
| Corning Glass Beads No. 0202 120/140 | $C_{18}H_{37}SiCl_3$ | 0.9 | 3 | Conc. HCl, reflux | 1 |
| | $C_6H_5(CH_3)SiCl_2$ | 1.1 | 3 | Conc. HCl, reflux | 17 |
| | | 1.3 | 3, 5 | Conc. HCl, reflux to initial treatment | 20 |
| | | 1.3 | 4 | 0.5 N NaOH | 2 |
| Silica Gel Davidson 08, 60/80 | $C_{18}H_{37}SiCl_3$ | 13.2 | 3 | Conc. HCl reflux | 4 |
| | $C_6H_5(CH_3)SiCl_2$ | 13.5 | 3 | Conc. HCl reflux | 18 |
| | | 13.5 | 3, 5 | Conc. HCl, reflux, KOH, no initial treatment | 9 |
| Chromosorb W, 60/80, "acid washed" | $C_6H_5(CH_3)SiCl_2$ | 9.4 | 3 | Conc. HCl, reflux | 4 |
| | $CH_3SiCl_3$ | 9.44 | 3 | Conc. HCl reflux | 0.42 |
| | $C_2H_5SiCl_3$ | 6.55 | 3 | do | 0.76 |
| | $C_3H_7SiCl_3$ | 6.55 | 3 | do | 0.76 |
| | $C_4H_9SiCl_3$ | 5.60 | 3 | do | 3.6 |
| Chromosorb G, 60/80, non-acid washed | $CH_3(H)SiCl_2$ | 7.93 | 3 | do | .38 |
| | $(CH_3)_2SiCl_2$ | 5.06 | 3 | do | 13 |
| | $(C_2H_5)_2SiCl_2$ | 1.87 | 3 | do | 79 |
| | $(CH_3)_2SiCl_2$, $CH_3SiCl_3$, 3:1M ratio. | 7.20 | 3 | Conc. HCl reflux | 12.5 | of a 5 percent by weight solution of methyltrichlorosilane in dry toluene and heated under reflux for 1 hour. The toluene layer is removed by decantation followed by filtration on a sintered-glass funnel, the material is washed with toluene, filtered under suction until air dried and washed with water until neutral. The mixture is then agitated in a potassium hydroxide solution of pH 10, and additional amounts of concentrated aqueous potassium hydroxide added to maintain the pH at this value. The alkaline solution is removed by decantation and filtration, and the Chromosorb washed with distilled water until neutral. The mixture is then suspended in dilute hydrochloric acid of pH 4, the suspension agitated and more hydrochloric acid added until the pH remains in the range of pH 6 to pH 4. The acid is then removed by decantation and filtration, the mixture washed three times with 200 ml. of acetone, filtered and dried in an evacuated vacuum desiccator at ambient temperature for 10 minutes.

Example IV.—Initial reaction

The activated Chromosorb produced by Examples "I" or "II" above is suspended in 250 ml. of dry toluene containing 20 grams of dimethyldichlorosilane and heated under reflux under conditions ensuring exclusion of atmospheric moisture. The volatile components are then removed in vacuo, though total drying is not required, and the surface treated Chromosorb resuspended in 150 ml. of dry toluene.

In accordance with the foregoing procedure but in place of using dimethyldichlorosilane, the same result is obtained using . . . methyltrichlorosilane, dimethyldichlorosilane, methyldichlorosilane; octamethylcyclotetrasilazane; trichlorosilane, silicontetrachloride; methyltriacetoxysilane, phenyltriacetoxysilane, dimethoxyphenylmethylsilane, tetramethoxysilane.

Example V.—Preparation of oligomer

To a magnetically stirred solution of methyl trichlorosilane (7.522 g.) in acetonitrile (50 ml.) a solution of water (0.679 g.) in acetonitrile (30 ml.) is added dropwise at ambient temperature and the mixture allowed to stand for 30 minutes to yield a solution of oligomer which is reacted with initially reacted substrate in accordance with the general procedure of Example VI in force.

In accordance with the above procedure but where the alkylhalosilane used is ethyltrichlorosilane, propyl trichlorosilane, butyltrichlorosilane, methylhydrogen dichlorosilane, dimethyldichlorosilane, diethyldichlorosilane and mixtures thereof, there is also obtained a solution of oligomers.

Example VI.—Polymerization step

To the suspension of substrate, there is added 12.3 grams of hexadecyltrichlorosilane. The suspension is then slowly evaporated in a fluted flask attached to a rotary evaporator. The flask is warmed gently in a water bath at 65° C. and the vacuum applied at a pressure of approximately 1 mm. of Hg. After substantially no further volatile components are drawn from the mixture, the mixture is heated under the same conditions for another 30 minutes. The treated Chromosorb is then polymerized in a fluidized bed utilizing an air stream of 120° C. containing water flow at 6–8 ml. of liquid water per hour for a time of 25–35 hours.

In accordance with the foregoing procedure but in place of utilizing hexadecyltrichlorosilane in the polymerization step, there may be utilized phenyl methyldichlorosilane, diphenylchlorosilane, and mixtures of either of these two halosilanes with hexadecyltrichlorosilane, octadecyltrichlorosilane, butyltrichlorosilane, phenylvinyldichlorosilane, methacryloxypropyltrichlorosilane, 3-(heptafluoroisopropoxy) propyltrichlorosilane, phenylmethyltrichlorosilane, phenyltrimethoxysilane, vinyltriacetoxysilane, β-cyanoethylmethyldiethoxysilane, diphenyldifluorosilane.

Example VII.—Polymerization of oligomer

In accordance with the procedure of Example VI but utilizing in place of the halosilanes thereof, the oligomeric solutions of Example V, there is similarly obtained a material wherein a siloxane polymer is attached to a silicious substrate. In utilizing the oligomers however, the fluid polymerization is run at ambient temperature to 120° C., depending on the oligomer used.

Example VIII.—Deactivation

The materials obtained by the process of Example VII are deactivated by suspending 100 grams of the treated material in a pressure resistant tube in a solution of 100 ml. of o-xylene containing 3 percent by weight of bis (trimethylsilyl) acetamide. The tube is closed with a Teflon-lined screw cap and heated to 145 degrees C. for 2 hours. The supernatant layer is removed by decantation, and the solid material filtered, rinsed three times with 100 ml. of dry benzene, suspended in dry methanol for 1 hour, filtered and soxhlet-extracted with methanol for 4 hours, and dried in a vacuum desiccator at 80° C. for 8 hours.

In accordance with the foregoing procedure dimethyl dichlorosilane may be utilized in place of bis (trimethylsilyl) acetamide.

We claim as our invention:

1. Novel silicious materials comprising a substrate of silicious material, certain silicon atoms of the surface of said substrate being bonded to other silicon containing groups to provide materials having a surface group having the partial structure as follows:

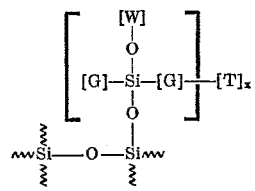

wherein the portion

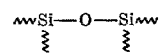

represents two adjacent silicon atoms in the substrate surface joined by an oxygen atom, where G is R or O—[W]

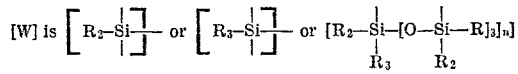

or

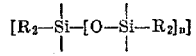

and may be the same or different wherein at least one bond of one silicon atom is linked to an oxygen atom outside the group, the remaining bonds linked to other O—[W] groups in the molecule to form a polymeric chain and the terminal [W] group in a chain is bonded to group [T], T is —OH, a labile group,

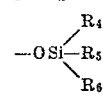

or lower alkoxy of 1 to 5 carbon atoms; R is lower alkyl, lower alkylphenyl, phenyl or phenyl lower alkyl wherein the alkyl group contains 1 to 5 carbon atoms; $R_2$ and $R_3$ are alkyl containing 1 to 30 carbon atoms, phenyl, substituted phenyl wherein the substituents are selected from the group consisting of lower alkyl, lower alkoxy, halo and nitro, or phenyl lower alkyl wherein the lower alkyl groups contain from 1 to 5 carbon atoms; $R_4$, $R_5$ and $R_6$ are phenyl, lower alkyl, lower alkoxy, lower alkylphenyl or phenyl lower alkyl and may be the same or different; wherein a labile group is any group which will react with (a) halosilane, (b) water or (c) a lower alkanol, and $n$ is an integer of 1–10, X is an integer designating the number of [T] groups required to terminate residual groups in groups [W] or [G].

2. A novel silicious material according to claim 1 wherein the silicious substrate is selected from the group consisting of diatomaceous earth, glass beads, silica gel, silica beads, and firebrick.

3. A novel silicious material according to claim 1 wherein the proportion by weight of the total material of the groups represented by the symbol W is between 0.1 to 50 percent by weight.

4. A novel silicious material according to claim 3 wherein R is methyl, W is octadecylsilyl, phenylmethyl silyl, diphenylsilyl or chlorophenylsilyl.

5. A novel silicious material according to claim 3 wherein R is methyl and W is polyalkylsiloxyl.

6. A novel silicious material according to claim 5 wherein W is polymethylsiloxyl containing between 2 and 10 silyl units.

7. A novel silicious material according to claim 4 wherein T is trialkyl siloxy or dialkyl alkoxy siloxy wherein the alkyl moieties contain 1 to 5 carbon atoms.

8. A novel silicious material according to claim 7 where T is trimethyl siloxy or dimethyl methoxy siloxy.

9. A process for the preparation of novel silicious materials according to claim 1 which comprises the steps of
   (1) treating the silicious substrate with a member selected from the group consisting of water, aqueous mineral acid, and aqueous alkali,
   (2) removing the acid, alkali or water,
   (3) reacting the silicious material with a polyfunctional silane having from 2–3 labile groups, under anhydrous conditions,
   (4) reacting the silicious material produced by the previous step with a monomer consistin of a silane monomer having 2–3 labile groups or a siloxane oligomer having at least 2 labile groups,
   (5) polymerizing said silane monomer or siloxane oligomer by reacting the product of the previous step with water.

10. A process according to claim 9 wherein the polyfunctional silane of step (3) thereof is selected from the group consisting of lower alkyl, polyhalosilanes, polyloweralkylsilazanes, polyhalosilanes, alkylpolyacyloxysilanes, polyacyloxysilane, polyalkoxysilanes and alkylpolyalkoxysilanes.

11. A process according to claim 10 wherein the polyfunctional silane of step (3) thereof is selected from the group methyltrichlorosilane, dimethyldichlorosilane, methyldichorosilane; octamethylcyclotetrasilazane; trichlorosilane, silicontetrachloride; methyltriacetoxysilane, phenyltriacetoxysilane, dimethoxyphenylmethylsilane, tetramethoxysilane.

12. A process according to claim 9 wherein the silane monomer of step (4) thereof is a compound of the formula $R_2SiX_3$ or $R_2R_3SiX_2$ and the oligomer of step (4) thereof is a compound of the general formula

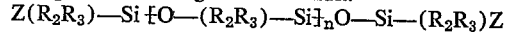

or

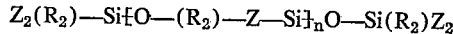

wherein $R_2$ and $R_3$ may be the same or different and $n$ is 0 or 1–10, and Z is halo.

13. A process according to claim 12 wherein the silane monomer is octadecyltrichlorosilane, butyltrichlorosilane, phenylvinyldichlorosilane, methacryloxypropyltrichlorosilane, 3 - (heptafluoroisopropoxy) propyltrichlorosilane, phenylmethyltrichlorosilane, phenyltrimethoxysilane, vinyltriacetoxysilane, β-cyanoethylmethyldiethoxysilane or diphenyldifluorosilane.

14. A process according to claim 12 wherein in the oligomer, $R_2$ and $R_3$ are methyl.

15. A process according to claim 14 wherein the oligomer contains from 3–5 silyl units.

16. A process according to claim 9 wherein the polymerization is carried out by the fluidized bed process in a carrier air stream containing water.

17. A process according to claim 9 comprising the additional step of treating the silicious material after step (5) with a silane having at least one labile group.

18. A process according to claim 17 wherein the labile groups are selected from halo, ester and ether.

19. A process according to claim 18 comprising the additional step of reacting the residual labile groups with a lower alkanol.

20. A process for the preparation of novel silicious materials according to claim 1 which comprises the steps of
   (1) treating the silicious substrate with a member selected from the group consisting of water, aqueous mineral acid and aqueous alkali,
   (2) removing the acid, alkali or water,
   (3) reacting the treated silicious material produced by the previous step with a silane monomer having 2–3 labile groups or a siloxane oligomer having at least 2 labile groups.
   (4) polymerizing said silane monomer or siloxane oligomer, by reacting the product of the previous step with water.

References Cited
UNITED STATES PATENTS 3,116,161  12/1963  Purnell ---------- 117—123 C
3,542,584  11/1970  Ottenstein ---------- 117—54

OTHER REFERENCES

Supina et al.: "Silane Treatment of Solid Supports for Gas Chromatography," J. Amer. Oil Chemists' Soc., May 1966, 202A, 204A, 228–230A (1966).

Abel et al.: "A New Gas-Liquid Chromatographic Phase," J. Chromatography, 22 (1966), 23–28.

WILLIAM D. MARTIN, Primary Examiner

D. COHEN, Assistant Examiner

U.S. Cl. X.R.

117—62.1, 100 S, 118, 123 C, Dig. 5